United States Patent [19]

Eelman et al.

[11] Patent Number: 5,135,350
[45] Date of Patent: Aug. 4, 1992

[54] METHOD FOR TRANSPORTING A PATIENT FROM AN AMBULANCE

[76] Inventors: Albert H. Eelman, 89 Summit Ave., Chadds Ford, Pa. 19317; Cornelius Eelman, P.O. Box 466, Bostwick, Fla. 32007

[21] Appl. No.: 390,470

[22] Filed: Aug. 3, 1989

Related U.S. Application Data

[60] Continuation of Ser. No. 158,862, Feb. 22, 1988, abandoned, which is a division of Ser. No. 78,407, Jul. 27, 1987, abandoned.

[51] Int. Cl.⁵ .............................................. B65G 67/02
[52] U.S. Cl. .................................... 414/786; 414/347; 414/498; 414/917; 414/921; 296/20; 5/81.1
[58] Field of Search ............... 414/786, 340, 341, 343, 414/345, 347, 400, 495, 498, 608, 917, 921; 5/81 R, 81 B, 81.1; 296/16, 19, 20; 254/10 R, 10 B, 10 C; 269/322

[56] References Cited

U.S. PATENT DOCUMENTS

| | | | |
|---|---|---|---|
| 1,110,838 | 9/1914 | Taylor | 5/81 B |
| 1,138,582 | 5/1915 | Sleicher | 296/20 |
| 2,356,913 | 8/1944 | Berman | 254/10 C |
| 2,650,731 | 9/1953 | Adler | 414/498 |
| 2,833,587 | 5/1958 | Saunders | 296/20 |
| 3,082,016 | 3/1963 | Pratt | 296/20 X |
| 3,117,765 | 1/1964 | Chiuzzi | 254/10 C |
| 4,078,269 | 3/1978 | Weipert | 296/19 X |
| 4,097,941 | 7/1978 | Merkel | 296/20 X |
| 4,222,132 | 9/1980 | Crim et al. | 5/81 R |
| 4,485,504 | 12/1984 | Lehmann | 296/20 X |
| 4,839,933 | 6/1989 | Plewright et al. | 5/81 R |

Primary Examiner—David A. Bucci
Attorney, Agent, or Firm—Herbert M. Wolfson

[57] ABSTRACT

This invention is a carrier for an ambulance litter which safely and easily transports a patient between the ambulance and a hospital gurney. The litter carrier includes a frame and a platform, the platform being pivotably mounted to the frame. Moving the platform around its pivot point causes the platform to be raised or lowered relative to the frame. To transport a patient, the operator raises the platform to the level of the ambulance floor, and moves the carrier to the vicinity of the ambulance. The operator then rolls or moves the litter out of the ambulance, onto the platform, and may then secure the litter to the platform with a suitable fastener. The platform includes channels which provide a path for the wheels or feet of the litter, and which tend to prevent the litter from falling from the carrier. As the platform is lowered, its downward movement is cushioned by shock absorbers. The operator then easily lifts the patient from the litter and onto the hospital gurney or other carrier. The height of the platform is adjustable, so that it can be used with a variety of ambulances. Moreover, the carrier can be used by a small crew, even by one person working alone, without endangering the patient.

6 Claims, 3 Drawing Sheets

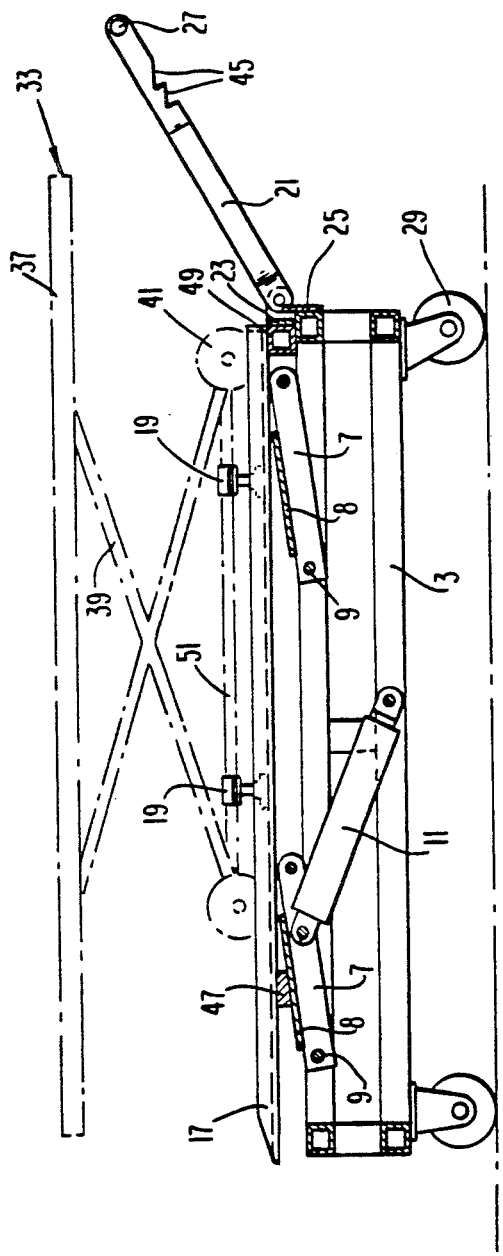
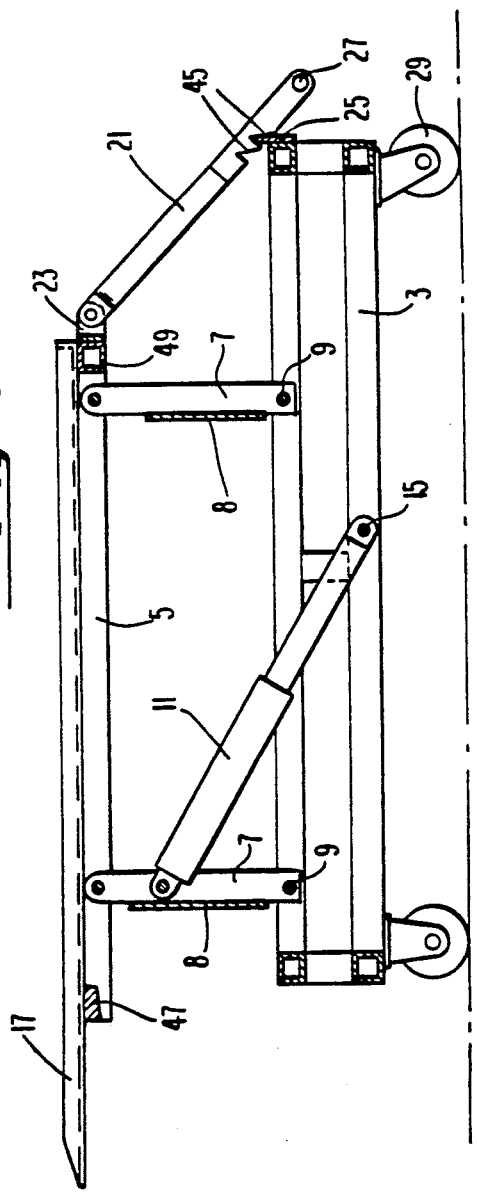

METHOD FOR TRANSPORTING A PATIENT FROM AN AMBULANCE

This application is a continuation of application Ser. No. 07/158,862 filed Feb. 22, 1988, now abandoned which is a division of application Ser. No. 07/078,407 filed Jul. 27, 1987, now abandoned.

BACKGROUND OF THE INVENTION

This invention concerns the transportation of a patient between an ambulance and a hospital emergency room, or other place of treatment.

At the scene of an accident or medical emergency, there are usually police or others available to assist an ambulance crew in loading the patient into the ambulance. The patient is placed on a litter, which is carried to the ambulance by several persons. But when the ambulance arrives at the hospital, it is not always easy to transport the patient. The hospital staff may be engaged with other emergencies. At night, or on holidays or weekends, there may not be personnel available to help to unload the patient. Thus, the ambulance crew, which may consist of only a driver and a first-aid person, must struggle to unload the patient, without assistance. The litter must be pulled out of the ambulance with one person on each side supporting the weight of the litter, and then lowered to the ground. Then, the litter must somehow be transported to the emergency room, or to another device which carries the patient to the emergency room. Typically, the ambulance crew leaves the patient on a litter, with the litter locked in its raised position.

The procedure described above is fraught with problems. Many times, a member of the ambulance crew drops his or her side of the litter. The litter may also tip over for other reasons. Sometimes, the locking mechanism on the litter breaks, causing the waiting patient to fall. All of these occurrences can cause serious harm to an already injured or sick person.

The present invention solves the above-described problems by providing a litter carrier which can be used to transfer a litter from an ambulance to a hospital emergency room. The litter carrier of the present invention is intended to remain at the hospital at all times, and therefore can be built to be strong and rigid, unlike the ambulance litter. The carrier can be used by one person working alone, and thereby conserves valuable hospital resources. Use of the carrier speeds the loading and unloading of patients, and thus saves precious time in emergency situations.

SUMMARY OF THE INVENTION

The present invention is a litter carrier which enables an ambulance crew to transport a patient quickly from the ambulance to an emergency room of a hospital. In its preferred embodiment, the invention includes a frame and a platform, the platform being pivotably mounted to the frame. As the platform is moved around its pivot points, it becomes raised or lowered relative to the level of the frame. The platform is connected to a locking means which holds the platform in a desired vertical position.

The platform preferably includes a pair of channels which guide the feet or wheels of the ambulance litter. Thus, when the platform is raised to the level of the floor of the ambulance, and the carrier is moved to the vicinity of the ambulance, the litter can be slid or rolled out of the ambulance and onto the platform, the litter being guided by the channels. The platform may also include strap means, or their equivalent, for securing the litter to the platform.

The carrier also includes at least one shock absorber for cushioning the downward movement of the platform. The carrier is preferably mounted on wheels or casters, or their equivalent, so that it can be easily moved, after the ambulance litter has been attached.

It is therefore an object of the invention to make it easy to carry a patient between an ambulance and a hospital emergency room.

It is another object of the invention to provide a litter carrier which can be operated by a very small crew.

It is another object to reduce the risk of injury to a patient, while the patient is being transported from an ambulance to an emergency room.

It is another object to reduce the amount of lifting which must be done by an ambulance crew.

It is another object to reduce the time required to load or unload a patient from an ambulance.

It is another object to provide a secure and safe means of transporting a patient between an ambulance and an emergency room, or other location.

Other objects and advantages will be apparent to those skilled in the art, from a reading of the following brief description of the drawings, the detailed description of the invention, and the appended claims.

BRIEF DESCRIPTION OF THE DRAWINGS

FIG. 3 is a vertical cross-sectional view of the litter carrier, taken from a direction similar to that of FIG. 4, showing the litter carrier in its lowered position, and also showing the litter in phantom.

FIG. 4 is a cross-sectional view, taken along the line 4—4 of FIG. 2.

DETAILED DESCRIPTION OF THE INVENTION

Figure 2:
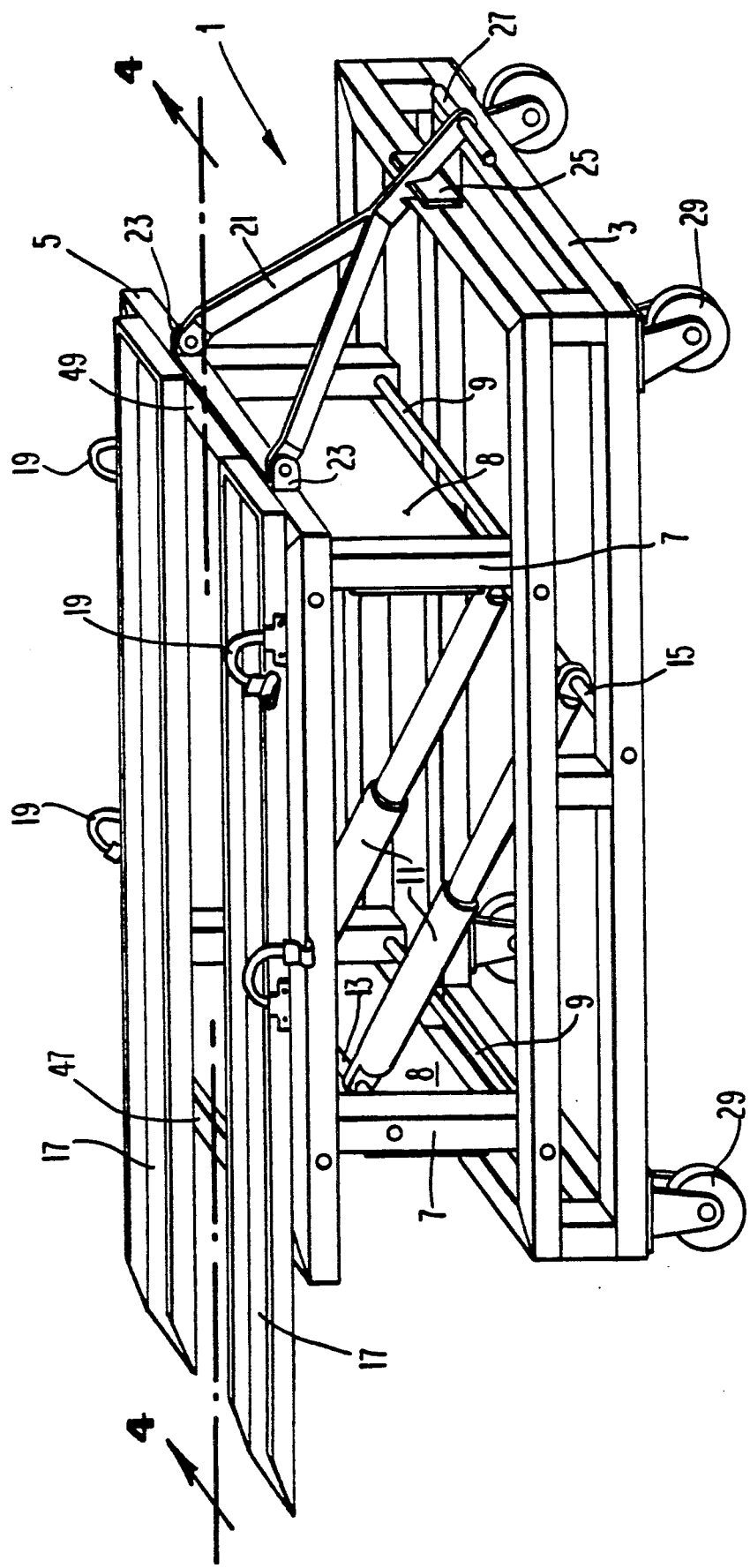
FIG. 2 is a perspective view of the litter carrier of the present invention.

The structure of the litter carrier of the present invention is shown in the perspective view of FIG. 2. Litter carrier 1 includes frame 3 and platform 5, secured to the frame by posts 7. The posts engage pivot bars 9, and are freely pivotable around these bars. Shock absorbers 11 are connected to support bars 13 and 15. The shock absorbers cushion the movement of the platform as it is lowered. Stiffeners 8 are mounted to the posts, to provide rigidity. The stiffeners tend to prevent bending and twisting of the platform.

Mounted on platform 5 are channels 17. The channels are generally rectangular, and are open at one end and closed at the other. The open ends of the channels extend beyond the end of the platform, so that the ends of the channels can be placed at or near the level of the ambulance floor, to enable the litter to slide easily onto the platform. The width and spacing of the channels are chosen so that the wheels or feet of the litter will fit within the channels, and so that the litter will be secure on the platform. Fastening means 19 provide additional security. In the preferred embodiment, the fastening means include a plurality of flexible straps attached to rigid caps which can engage the litter. However, the fastening means can take many other forms, and can also be omitted entirely.

The channels are shown with tapered ends. The tapered ends are provided primarily for the sake of appearance, and to eliminate sharp edges. However, the ends of the channels could also be square.

Adjustment member 21 is mounted to platform 5 by brackets 23, and includes a notched portion which engages plate 25. Adjustment member terminates in handle portion 27. The adjustment member maintains the platform in the desired vertical position. Before the platform can be moved again, the adjustment member must be disengaged from the plate by pivoting it around its brackets.

The litter carrier is mounted on casters 29, or their equivalents, to make it possible for one person to move the carrier with the litter attached.

Figure 1:
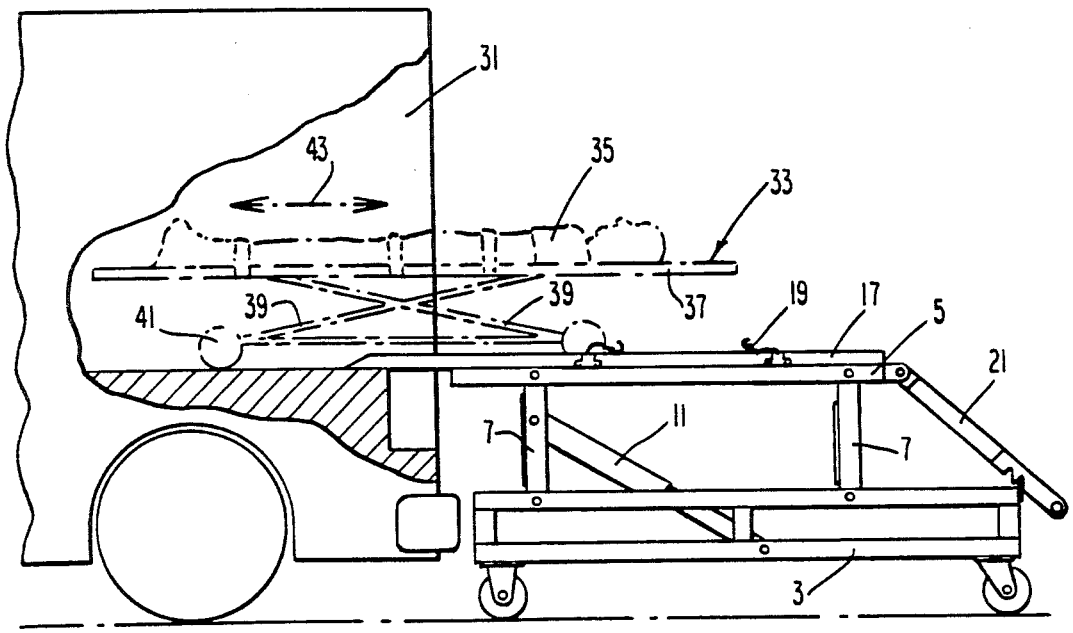
FIG. 1 is a partially-fragmentary view, in side elevation, showing the use of the litter carrier of the present invention, the figure showing the litter being moved from the ambulance onto the carrier.

FIG. 1 shows the use of the litter carrier of the present invention. FIG. 1 is a partially-fragmentary side elevational view, showing ambulance 31, litter 33, and patient 35. The litter includes a cot portion 37, cot supports 39, and wheels 41. The litter can thus move laterally, as shown by arrows 43. The wheels can be replaced by other equivalent structures, or by stationary feet, in which case the litter is moved by sliding instead of rolling. What is important is that the wheels or feet fit within the channels of the platform.

FIG. 3, is a cross-sectional view, similar to that of FIG. 4, showing the litter carrier in its lowered position, and also showing the litter in phantom. FIG. 3, shows the transverse members of the platform, designated by reference numerals 47 and 49, and also visible in FIG. 2. When the litter carrier is in the fully lowered position, transverse member 49 rests upon frame 3, and transverse member 47 abuts stiffener 8 of the post 7 at the opposite side of the carrier. Transverse member 47 has a trapezoidal cross-section to provide the necessary clearance upon lowering of the platform.

FIG. 3, also clearly shows adjustment member 21, which, when the platform is fully lowered, no longer engages plate 25. Notches 45 in the adjustment member are visible in this figure. The figure also shows the fastening means attached to base support member 51 of litter 33.

FIG. 4, a cross-sectional view taken along the line 4-4 of FIG. 2, shows the carrier from the same general direction as that of FIG. 3, with the litter carrier in the raised position. FIG. 4 also shows transverse members 47 and 49 of platform 5, and illustrates posts 7 in the vertical position.

The pivoting motion of the posts causes channels 17 to move horizontally, towards and away from the ambulance. That is, when the platform is fully lowered, as shown in FIG. 3, the channels substantially coincide with the length of the frame. But when the platform is raised, the channels extend beyond the frame, as shown in FIG. 4. Thus, the platform moves towards and away from the ambulance while the frame of the carrier remains stationary.

Figure 5:
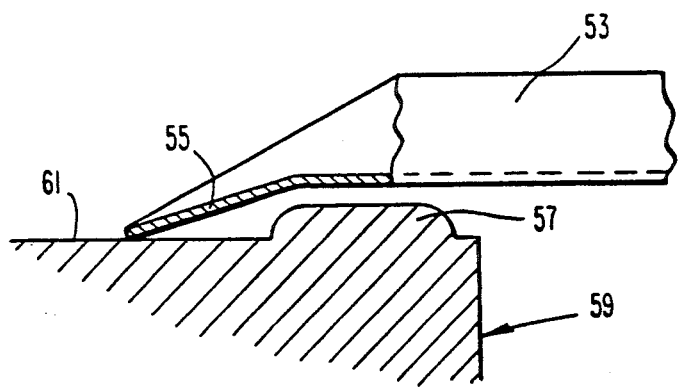
FIG. 5 is a detail showing an alternative embodiment which can be used with an ambulance having a sill or other obstruction in its floor.

FIG. 5 shows an alternative construction of the channels, which is used where the ambulance floor has a sill, or similar obstruction, which interferes with the movement of the litter onto the carrier. FIG. 5 depicts a fragment of ambulance 59, whose floor 61 includes sill 57. In this case, channel 53 is constructed with a ramped portion 55 which by-passes the sill and provides an unobstructed path for the litter.

It is also possible to provide one or more hooks (not shown), at the end of the channels, for grasping a mating socket (not shown) on the ambulance. Such an arrangement can hold the carrier in place while the patient is being transferred. The hooks are not absolutely necessary, however, and other means of stabilizing the carrier (such as brakes, etc.) may be used.

In operation, the litter carrier is rolled to the opened ambulance, and the platform is raised to the level of the ambulance floor. The platform can be raised by simply placing a foot on the frame to hold it in place, and by pushing the platform towards the rear (i.e. towards the ambulance), while lifting the platform until an appropriate notch has engaged the plate. The platform is lifted to the position which most nearly makes the bottom of the channels level with the ambulance floor.

The litter is then pushed or rolled onto the platform, within the channels. The fastening means, if present, are fastened around the litter to prevent it from falling from the carrier. The adjustment member is released from the latched position, and with a slight push on the platform, the platform moves downward, its motion being cushioned by the shock absorbers. The carrier is then rolled to another location, generally within the hospital. The litter will then be low enough for the patient to be transferred easily to a hospital gurney or operating table, or the like. The process can be reversed if it is necessary to transfer a patient from the hospital to the ambulance.

The present invention thus eliminates the need to lift a patient and litter into and out of an ambulance. The only lifting of the patient occurs outside of the ambulance, i.e. in transferring the patient from the litter to the hospital gurney. However, the latter task is relatively easy, because, with the present invention, the level of the litter and the gurney can be substantially equalized before the patient is lifted.

The present invention improves the safety of the patient, because it does not strain the ambulance litter. Ambulance litters are inherently flimsy and unsafe. They must be designed to be light in weight so that they can be lifted with a patient, and so that they can fit into narrow spaces in the field. But the lightness is a disadvantage when the litter is the vehicle which moves the patient. Moreover, the the ratio of the wheelbase to the height of most ambulance litters is not sufficient to assure stability in any extended position. In short, the litter is "top heavy" when carrying a patient.

The litter carrier of the present invention, by contrast, is built more solidly than any known ambulance litter. A heavy construction is practical because the carrier stays at the hospital at all times, and is used only to transport patients between the ambulance and the hospital. The carrier can therefore be made sufficiently wide to assure stability, and can be constructed of heavy materials. Unlike the case with ambulance litters, there is very little danger of structural failure of the carrier of the present invention. Moreover, since the unit remains at the hospital, it is not subject to damage due to vibration associated with transportation in a vehicle.

The present invention has the additional advantage that it can be operated by untrained personnel. The invention makes it very unlikely that a patient will be accidentally dropped while being removed from the ambulance. Also, the unit can be operated by a very small crew, even by one person working alone.

Because of the above-described structural advantages, the present invention also reduces the time needed to unload a patient from an ambulance. There are many occasions when the few minutes saved in this manner could make the difference between life and death.

While the imvention has been described with respect to a particular embodiment, it is understood that the invention can be modified in many ways. For example, it is possible to use different means of moving the litter and/or carrier. The particular shape and structure of the frame and platform could be changed. The configuration of the shock absorbers and the adjustment member could also be varied. Also, the invention is not limited to use in transporting a patient between an ambulance and an emergency room, but can be used in any context wherein a patient must be transferred from one cot or table to another. These and other similar modifications should be deemed within the spirit and scope of the following claims.

What is claimed is:

1. A method of transporting a patient from a floor of an ambulance, the patient being disposed on a litter on the floor of the ambulance, the litter having supports that can either roll or slide, comprising the steps of:
   a) positioning a carrier with a vertically movable platform thereon sufficiently close to the floor of the ambulance to facilitate transfer of the litter with the patient disposed thereon from the floor of the ambulance onto said platform, the platform being supported by the carrier, the carrier having means for transportation thereunder and the platform having channels for guiding the litter supports;
   b) raising the platform to a level of the floor of the ambulance;
   c) moving the litter from the floor of the ambulance in a manner such that the litter supports are moved into the channels of the platform;
   d) transporting the carrier having the platform thereon with the litter and patient disposed on said platform to a desired location having a hospital facility with a support for the patient;
   e) lowering the platform abruptly but without shocking the patient on the litter to a selected level by means for vertically moving incorporated in said carrier, the selected level being that of the hospital facility on which the patient will lie; and
   f) moving the patient from the litter to the hospital facility.

2. The method of claim 1 wherein the platform is raised manually and can be locked in a desired vertical position.

3. The method of claim 2 wherein the carrier has at least one shock absorber for cushioning the downward movement of the platform and step (e) is conducted by releasing the platform from its vertical position abruptly so that it falls to the predetermined level.

4. The method of claim 1 wherein the carrier is mounted on wheels or casters.

5. The method of claim 1 wherein the litter is supported on wheels.

6. The method of claim 3, wherein the lowering step includes the step of unlatching the platform so that the platform with the litter thereon can fall without imposing shock on the patient disposed on the litter.

* * * * *